Feb. 11, 1969     E. McCOWAN     3,426,601
COMBINED STATIC AND DYNAMIC WHEEL BALANCER
Filed Nov. 12, 1965
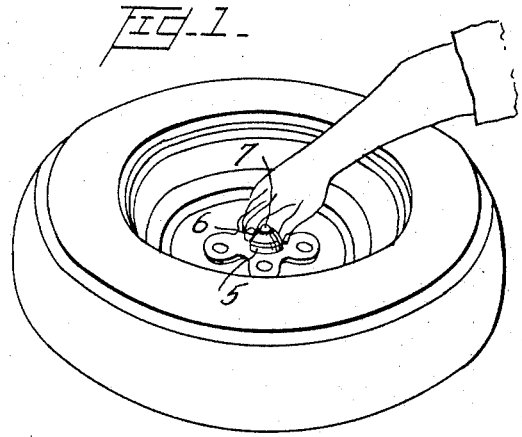
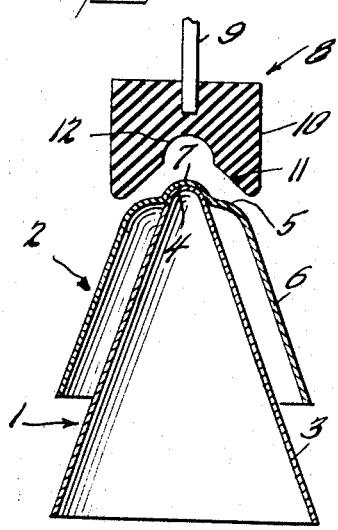
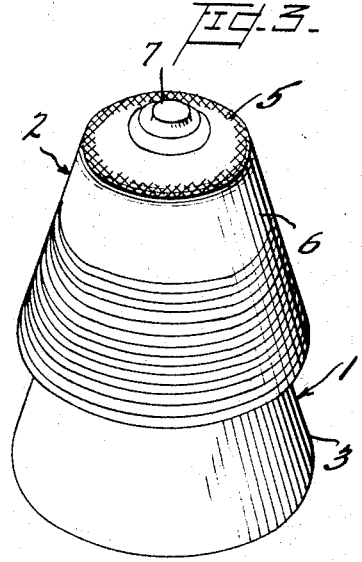
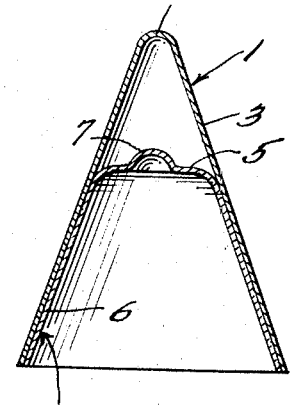
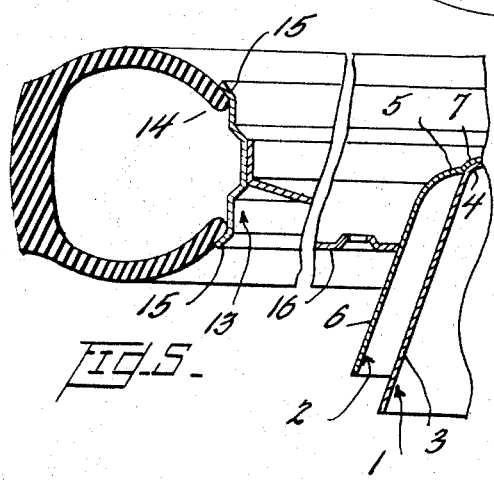
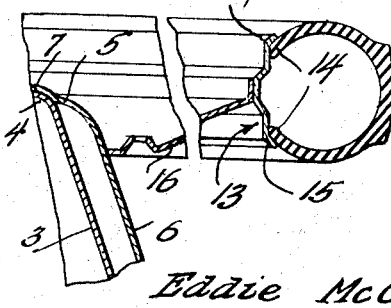
INVENTOR
Eddie McCowan,
BY Smith, Michael, Bradford
& Gardiner
ATTORNEYS United States Patent Office 3,426,601
Patented Feb. 11, 1969

3,426,601
COMBINED STATIC AND DYNAMIC WHEEL BALANCER
Eddie McCowan, Middleburg, Ky. 42541
Filed Nov. 12, 1965, Ser. No. 507,281
U.S. Cl. 73—459                                  4 Claims
Int. Cl. G01m *1/04, 1/16*

ABSTRACT OF THE DISCLOSURE

A compact, portable wheel balancer comprising a hollow frusto-conical rotor and a conical base each having a similar pitch whereby the tip of the conical base provides a bearing to support the rotor in free working relationship thereon, and the elements can be disassembled and the rotor telescoped within the base for storage.

---

The invention relates to a combined static and dynamic wheel balancer, and particularly to a simplified device for carrying out such methods as disclosed in U.S. Patent 2,298,656, issued Oct. 13, 1942 to Roy D. Smith.

This invention stems from a realization that a need for static and dynamic wheel balancing often arises at locations where elaborate wheel balancing machinery is not available and where transportation of the wheel to such facilities is not feasible. Such needs often arise in connection with emergency "on the road" repairs, construction projects, or farm operations. As a result of this realization, this invention has been developed and has as its objects:

(1) The provision of a simplified static and dynamic wheel balancer which can be made available at a cost attractive to the average motor vehicle owner, (2) The provision of a simplified static and dynamic wheel balancer which will accommodate a wide variety of wheel sizes without requiring readjustment, (3) The provision of a simplified static and dynamic wheel balancer which requires no self-contained driving source, (4) The provision of a simplified static and dynamic wheel balancer which can be readily stored in an inoperative condition.

Other objects and advantages of this invention will become apparent from a consideration of the ensuing specification and the accompanying drawings, in which parts are indicated by like reference numerals throughout the several figures, and in which:

FIGURE 1 is a perspective view of the wheel balancer of this invention with a wheel positioned thereon and illustrating the manner of rotation of the device by hand, FIGURE 2 is a vertical section of the wheel balancer of this invention and of a driving member positioned for driving engagement therewith, FIGURE 3 is a perspective view of the wheel balancer of this invention, FIGURE 4 is a vertical section of the wheel balancer of this invention in its inoperative storage position, FIGURE 5 is a vertical section through one half of the wheel balancer of this invention and of a large wheel positioned thereon, FIGURE 6 is a vertical section through one half of the wheel balancer of this invention and of a small wheel positioned thereon.

The simplified combined static and dynamic wheel balancer of this invention comprises generally a base member 1 and a rotor member 2 mounted thereon. The base member comprises an inverted hollow conical member including a conical portion and a bearing tip 4. The bearing tip is preferably of semi-spherical configuration, but alternatively could be of any configuration which would permit a freedom of tilting movement of the rotor member mounted thereon in any degree of azimuth. The rotor member 2 is generally bell-shaped configuration and comprises an inverted cup-shaped crown 5 and a frusto-conical skirt 6 depending from a juncture with the outer periphery of the crown 5, the wall of the skirt 6 diverging downwardly at a pitch substantially the same as the pitch of the conical portion of the base member.

The crown 5 has a centrally disposed bearing portion 7 the undersurface of which is preferably semi-spherical and is complemental to the bearing tip of the basee 1. The outer surface of the centrally disposed bearing portion 7 is preferably semi-spherical, and of a radius smaller than the radius of the surrounding portion of the crown 5. Thus, the outer surface of the bearing portion extends above the outer surface of the surrounding portion of the crown to provide an indexing portion to guide a driving tool into proper driving relationship in a manner yet to be described.

One feature of the invention resides in the aforementioned choice of the same pitch for both the conical base member 1 and the frusto-conical skirt 6 of the rotor member 2 whereby the base member 1 may be telescoped over the rotor member 2 in an inoperative position for storage. When so related, the rotor 2 nests snugly within the hollow base member 1 as shown in FIGURE 4, the close juxtaposed relationship of the contiguous surfaces of the skirt 6 and conical portion 3 causing a frictional retention of the rotor within the base. Thus, the assembly may be readily stored as in a mechanic's tool box, without the necessity of blocking the device to stabilize the rotor or the use of an external packing container. The balancer is so compact as to occupy very little space and light enough to add little weight, thus can be readily carried with other tools to its point of use or carried routinely in a mechanic's tool box so as to be available when an unforeseen need for its use should arise.

For assembling the balancer in operative relationship, the elements are readily separated from the aforedescribed nested or storage relationship and the base member 1 is placed on a reasonably horizontal surface. Preferably, a lubricant, such as a drop of oil, is placed on the bearing tip 4, and the bell-shaped rotor member 2 is telescoped over the base member 1, the bearing portion 7 of the rotor resting on the bearing tip 4 of the base member 1.

As is evident by reference to FIGURE 2, the crown 5 of the rotor serves to space the skirt 6 from the conical portion 3 of the base 1, thus permitting a freedom of tilting movement of the rotor about the bearing tip 4 of the base in every degree of azimuth. The spacing of the skirt 6 and cone 3 are sufficient to permit tilting at an angle indicative of normally encountered amount of unbalance of a wheel to be supported thereon plus any relative tilting that may be introduced by a deviation of the supporting surface from a true horizontal.

The crown 5 is of a relatively wide diameter, preferably 1½ inches or more in diameter as measured to the juncture of its outer periphery with the depending frusto-conical skirt 6. The outer surface of the crown is rounded near its outer periphery to provide a driving surface which may be grasped between the thumb and fingers for the purpose of rotating the device, as seen in FIGURE 1. To facilitate grasping the rounded portion of the crown, it may be provided with a knurled or similar friction surface.

Alternatively, a driving tool, indicated generally at 8 (FIGURE 2), may be provided for use with a conventional power drill (not shown). The driving tool comprises a shank 9 and a chuck 10, the chuck including a socket defined by a conical wall 11 terminating at its apex in a depression 12 of a configuration closely approximating that of the bearing portion 7 of the crown 5 of the rotor member 2. The angle of divergence of the conical socket wall 11 is such that it will, when brought into driving relationship with the rotor member 2, engage the crown 5 thereof at a point near its juncture with the skirt 6. At the same time, the bearing portion 7 of the crown 5 will nest within the semi-spherical depression 12 of the driving tool to guide the tool and bring it into well-centered driving relationship so that no unbalance will be imparted to the rotor member 2 by virtue of a misalignment of the driving member 8. Thus, the bearing portion 7 of the rotor 2 serves to guide the tool into proper alignment, while the particular configuration of the crown 5 provides a wide driving surface for frictional contact between the tool 8 and the rotor 2.

For use, the wheel balancer is assembled in the manner previously set forth, and a vehicle wheel and tire assembly is placed on the balancer in the manner illustrated in FIGURES 5 and 6. It will be aparent from an examination of these figures that conventional automotive wheels vary considerably in size depending upon the size of tire which they accommodate. Despite a wide variance in size, however, most commonly used wheels conform to certain basic proportions in their dimensions. Thus, a wheel comprises a rim 13 of an appropriate width to receive the beads 14 of a tire between out-turned peripheral flanges 15. Disposed within the confines of the rim 13 is the wheel disc 16 which is "dishpanned" to bring the center portion thereof to one side of a plane including the center of the running surface of the tire. The center portion of the disc includes a hub opening of a size which has been observed to bear a direct relationship to the overall size of the wheel. It can be seen from a comparison of FIGURES 5 and 6 which illustrate respectively large and small wheels in position on the wheel balancer, that the relatively large hub opening of the larger wheel of FIGURE 5 rides relatively further down on the frusto-conical skirt of the rotor than does that of the small wheel of FIGURE 6. It can also be observed that the larger wheel of FIGURE 5 is characterized by a wider rim (and tire) and by a more pronounced or deeper "dishpan" to the disc 16, the net result being that planes including the center of the running surfaces of wheels and tires of various heights are maintained at substantially the same height by virtue of the conical skirt 6. By repeated observations and trials with a large variety of wheel sizes, it has been determined that a rotor member dimentioned so that the juncture of the crown 5 and the frusto-conical skirt is substantially 1½ inches in diameter and the skirt depends from said juncture with a downwardly diverging angle of from 12 to 20 degrees from the vertical axis and terminates at a lower edge of 3½ inches in diameter or more provides wheel balancer of optimum dimensions for maintenance of the aforedescribed uniform disposition of the center line of the running surfaces. The bell-shaped configuration of the crown portion combines with the aforedescribed dimensions to dispose the bearing point of the rotor at or slightly above the plane of the center line of the wheel running surface, thereby obtaining the optimum conditions of balance recognized as desirable in both static and dynamic balancing. The center of gravity of the wheel is disposed at or slightly below the bearing point so that the requisite pendulum action is obtained, and such condition exists for most commonly used wheel sizes without any necessity of adjusting the rotor position when changing wheels of varying dimensions. In order to facilitate symmetrical placement of the wheel on the rotor, the skirt 6 may be provided with indicia in the form of concentric rings as seen in FIGURE 3.

The operation of the device is conventional and is well known in the art. For a detailed description of the method of use, reference is made to Patent No. 2,146,417 issued Feb. 7, 1939 to W. A. Catalano and to Patent 2,298,656 issued Oct. 13, 1942 to R. D. Smith. This invention thus provides a lightweight simplified combined static and dynamic wheel balancer which will accommodate a wide variety of wheel sizes without adjustment and is susceptible of easy storage. The foregoing description of an embodiment of the invention is provided for illustrative purposes only it being understood that the basic invention is susceptible of various alternatives in construction without departing from the scope of the invention as defined in the following claims.

What is claimed is:
1. A combined static and dynamic wheel balancer comprising in combination a hollow frusto-conical rotor member comprising a conical skirt and a crown, and a hollow conical base member comprising a conical portion and a tip portion, said conical portion and said skirt having substantially the same pitch, said base member being telescoped over said rotor member in non-working relationship whereby at least said crown of said rotor member nests within said hollow conical base member, the contiguous portions of said skirt and said conical portion being in close juxtaposed relationship whereby said members are restrained from relative movement.

2. A combined static and dynamic wheel balancer comprising in combination a hollow inverted cup-shaped rotor member comprising a frusto-conical skirt and a crown, and a conical base member comprising a conical portion and a tip portion, said skirt and said conical portion having substantially the same pitch, said rotor member being telescoped over said base member in working relationship whereby said tip portion of said base member bears against a central point on the underside of said crown of said rotor member to maintain said skirt and said conical portions in spaced relationship whereby said rotor member is free to tilt in any degree of freedom with respect to said base member.

3. A combined static and dynamic wheel balancer as set forth in claim 2 wherein said central point comprises a semi-spherical bearing portion, the underside of said bearing portion having a concavity complemental to said tip of said base member.

4. A combined static and dynamic wheel balancer as set forth in claim 3 wherein said semi-spherical bearing portion includes a convex outer surface extendng above the other portions of said crown to provide indexing means for centering a drive member.

References Cited
UNITED STATES PATENTS

| | | | |
|---|---|---|---|
| 2,631,452 | 3/1953 | Hutter | 73—484 |
| 2,816,446 | 12/1957 | Palmer | 73—483 |
| 2,979,958 | 4/1961 | Kennedy | 73—483 |
| 3,085,442 | 4/1963 | Bageman | 73—483 |
| 3,164,996 | 1/1965 | Carrigan | 73—483 |
| 3,280,640 | 10/1966 | Fuertges | 73—484 |
| 3,357,258 | 12/1967 | Snider | 73—483 |

FOREIGN PATENTS

| | | |
|---|---|---|
| 914,789 | 7/1954 | Austria. |
| 556,137 | 4/1958 | Canada. |
| 898,021 | 6/1962 | Great Britain. |

JAMES J. GILL, *Primary Examiner.*

R. S. SALZMAN, *Assistant Examiner.*

U.S. Cl. X.R.

73—484